Jan. 9, 1968     A. POTOMAK     3,362,446

CIRCULAR SAWS

Filed Oct. 18, 1965

INVENTOR.
ANDREW POTOMAK
BY
ATTORNEY

United States Patent Office 3,362,446
Patented Jan. 9, 1968

3,362,446
CIRCULAR SAWS
Andrew Potomak, 935 Woodland Drive, Vancouver,
British Columbia, Canada
Filed Oct. 18, 1965, Ser. No. 497,126
2 Claims. (Cl. 143—133)

ABSTRACT OF THE DISCLOSURE

A circular saw blade is provided with a single circular row of teeth shoulders which carry thicker tips formed into concave profiled twin teeth and, on occasion, interposed raker teeth.

---

This invention relates to circular saws carbide-tipped or plain circular saws, particularly twin cut tooth to the gullet between the teeth of the circular saws.

At present circular saws are provided with gullets between the teeth that are straight or flat on the bottom of the gullets. The flat shape on the bottom of the gullets causes the cuttings, for example the chips, from the material on which the circular saw is working to pile up and cause overheating and burning and also breaking of the saw teeth during the cutting operations. On certain cutting jobs it is necessary to have as many teeth as possible on the circular saw to obtain a smooth cut. Heavy damage to the present circular saws rotating and moving in the direction of the cut is caused by the material getting jammed between the saw blade and the work bench. This usually causes breakage of the saw teeth mainly due, as pointed out above, to the large opening in the gullet.

The main object of this invention is to provide a circular saw, that is efficient, durable and economically constructed.

Another object is to provide a circular saw that will prevent overheating and burning and the breaking of saw teeth during cutting operations.

Another object is to provide a circular saw that is so shaped that the plugging up of the gullets between the saw teeth is prevented.

Another object is to provide a circular saw in which the number of saw teeth is considerably reduced.

Another object is to provide a circular saw that can be used for cutting wood, plastics and non-abrasive metals.

The above objects are accomplished by providing a circular saw having single twin-cut teeth, between which raker teeth are spaced as desired. For example the teeth may be twin-cut teeth and raker teeth alternately. Or there may be two twin-cut teeth followed by a raker tooth and then two more twin-cut teeth and so on. The raker teeth would be spaced between the twin-cut teeth according to the type of material to be cut, and so break the size of the chips into smaller pieces. The lower parts of the gullets are slanted alternatively on one side and then on the other which practically eliminates any chance of the cuttings or chips piling up in the gullets and thus causing the overheating and burning. Due to this arrangement of slanted gullets the opening into the gullet can be smaller than on saws in present use. This smaller opening prevents bigger pieces of cuttings from being jammed into the gullet which usually results in the breaking of the saw teeth. The saw teeth are provided with a shoulder behind the cutting points which takes the impact of the material being jammed between the saw blade and the work bench and also prevents breakage of the teeth. The points of the twin-cut teeth and the raker teeth can be pointed or a little flattened depending on the material to be cut.

The invention consists of the novel arrangements, construction and combinations of parts hereinafter described and shown in the drawings.

Figure 1:
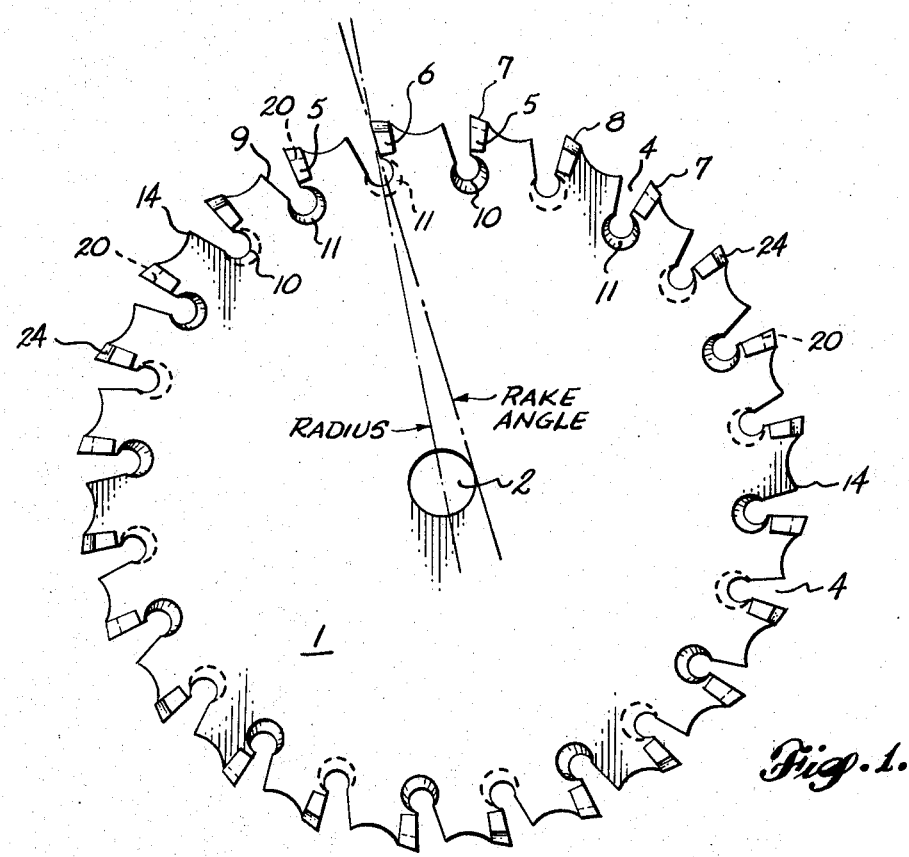
FIGURE 1 is a plan view of the circular saw constructed in accordance with and embodying the present invention.

Referring to the drawings, particularly FIGURE 1, the circular saw consists of a circular plate 1 having a central aperture 2 for mounting on a spindle for rotation, teeth 3 are uniformly spaced around the periphery of the circular plate 1. The teeth 3 are separated from one another by gullets 4.

Figure 2:
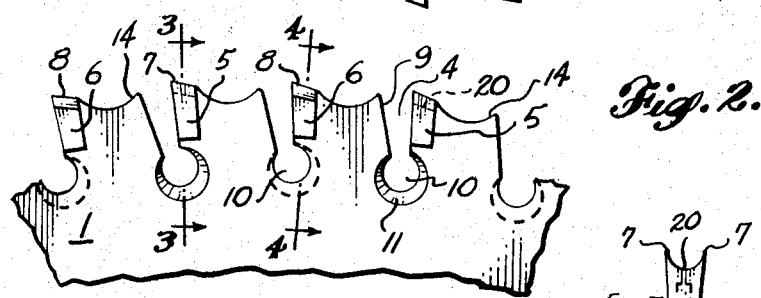
FIGURE 2 is an enlarged fragmentary view in plan of the circular saw showing in more detail the tooth profile forming an essential part of the present invention.

Referring to FIGURES 1 and 2 the teeth 3 consist of twin-cut teeth 5 and raker teeth 6 spaced alternately by the gullets 4 around the periphery of the circular plate 1.

The cutting edges of the twin-cut teeth 5 are shown at 7 and the cutting edge of the raker teeth 6 are shown at 8. Referring to FIGURE 2 the outer parts 9 of the gullets 4 are comparatively narrower than the gullets on circular saws in present use. The bottom part 10 of the gullets 4 is circular shaped. The circular plate 1 surrounding the bottom parts 10 of the gullets 4 is slanted at 11 alternatively to opposite sides of the circular plate 1 to prevent the cuttings from plugging the gullets 4.

Figures 3, 4:
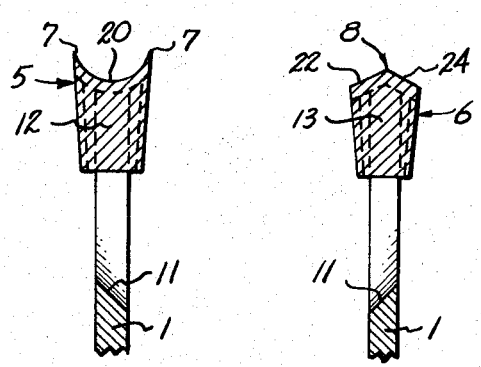
FIGURE 3 shows a cross-section on the line 3—3 of the twin-cut tooth shown in FIGURE 2 of the carbide tipped type.
FIGURE 4 shows a cross section on the line 4—4 of the raker tooth shown in FIGURE 2 of the carbide-tipped type.

Referring to FIGURE 3 a twin-cut tooth 5 is shown on which is mounted a carbon tip 12. The carbon tip 12 has the twin cutting edges 7. The slanted gullet is shown at 11. Referring to FIGURE 4 a raker tooth 6 is shown on which is mounted a carbon tip 13. The carbon tip 13 has the pointed cutting edge 8. The slanted gullet is shown at 11.

Figures 5, 6:
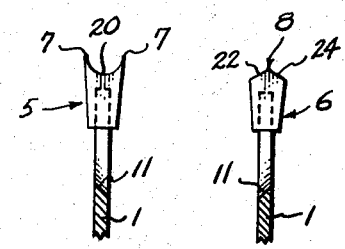
FIGURE 5 is a face view of the twin-cut tooth shown in FIGURE 3.
FIGURE 6 is a face view of the raker tooth shown in FIGURE 4.

Referring to FIGURE 5 a plain type twin-cut tooth 5 is shown having the twin cutting edges 7. Referring to FIGURE 6 a plain type raker tooth is shown. The slanted gullet is shown at 11 in both FIGURES 5 and 6.

A shoulder 14 is formed at the rear of each of the twin-cut teeth and the raker teeth. The shoulders 14 are slightly lower than the cutting edges of the teeth 5 and 6 as shown in FIGURES 1 and 2 and tend to prevent cuttings getting jammed between the circular saw and the work bench.

It is to be understood that changes and modifications in the form, construction, arrangement and combination of the several parts of the circular saw may be made and substituted for those herein shown and described without departing from the nature and principle of my invention.

The embodiments of the invention in which an exclusive privilege or property is claimed are as follows:

1. In a circular saw blade wherein a substantially annular plate, having an axial aperture for rotative mounting, is provided with a plurality of peripherally disposed tooth shoulders located in a single circular row, each in following relation to a gullet, the improvement, comprising:
  a carbon tip thicker than and mounted on the leading portion of each of said shoulders;
  each of at least half of said carbon tips having a forward facing cutting edge shaped to a transversely concave profile, symmetrical of said plate, and terminating in sharply angled projections at the sides, constituting twin teeth.
2. The subject matter of claim 1 in which raker teeth are interposed on shoulders intermittently between said twin teeth.

References Cited

UNITED STATES PATENTS

| | | | |
|---|---|---|---|
| 1,336,209 | 4/1920 | Driver | 143—133 |
| 3,071,027 | 1/1963 | Hiltebrand. | |
| 3,294,132 | 12/1966 | Little | 143—133 X |

FOREIGN PATENTS

| | | |
|---|---|---|
| 766,929 | 1/1957 | Great Britain. |
| 594,093 | 5/1959 | Italy. |

DONALD R. SCHRAN, *Primary Examiner.*